(12) United States Patent
Sugitani et al.

(10) Patent No.: US 8,290,658 B2
(45) Date of Patent: Oct. 16, 2012

(54) VEHICLE CONTROL SYSTEM AND METHOD FOR JUDGING ABNORMALITY IN VEHICLE CONTROL SYSTEM

(75) Inventors: Nobuo Sugitani, Saitama (JP); Yutaka Horiuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 12/602,309

(22) PCT Filed: May 28, 2008

(86) PCT No.: PCT/JP2008/059824
§ 371 (c)(1),
(2), (4) Date: Nov. 30, 2009

(87) PCT Pub. No.: WO2008/146850
PCT Pub. Date: Dec. 4, 2008

(65) Prior Publication Data
US 2010/0191405 A1 Jul. 29, 2010

(30) Foreign Application Priority Data
May 30, 2007 (JP) .................................. 2007-143147

(51) Int. Cl.
*G01M 17/00* (2006.01)

(52) U.S. Cl. ........................................ 701/29.1; 701/36

(58) Field of Classification Search .................... 701/37, 701/48, 29, 36, 29.1
See application file for complete search history.

(56) References Cited

U.S. PATENT DOCUMENTS

| 6,945,541 | B2 * | 9/2005 | Brown ........................ 280/5.507 |
| 2003/0209869 | A1 * | 11/2003 | Kwon ......................... 280/86.75 |
| 2005/0098964 | A1 * | 5/2005 | Brown ............................ 280/5.5 |
| 2008/0051941 | A1 |  2/2008 | Horiuchi et al. |

FOREIGN PATENT DOCUMENTS

| DE | 10 2007 058143 A1 | 6/2008 |
| EP | 1 975 041 A2 | 10/2008 |
| EP | 1 975 041 A3 | 12/2008 |
| JP | 2-43674 B2 | 10/1990 |
| JP | 6-263048 A | 9/1994 |
| JP | 8-142893 | 6/1996 |
| JP | 2001-322557 A | 11/2001 |
| JP | 2006-182239 A | 7/2006 |
| JP | 2006-290302 A | 10/2006 |
| JP | 3901190 B2 | 4/2007 |

* cited by examiner

*Primary Examiner* — Hussein A. Elchanti
(74) *Attorney, Agent, or Firm* — Arent Fox LLP

(57) ABSTRACT

The main calculation section (37*a*) of a toe angle alteration control ECU (37) in a vehicle control system receives target toe angles $\alpha_{TL}$ and $\alpha_{TR}$ from a steering control ECU (130) and controls a motor (31$_L$) for changing the toe angles of a left rear wheel and a motor (31$_R$) for changing the toe angle of a right rear wheel independently. Stroke sensors (38$_L$, 38$_R$) detect actual toe angles $\alpha_L$ and $\alpha_R$ and inputs to the judging portion (85) of actuations of the sub calculation section (37*c*). In accordance with a pre-stored judgment table (85*a*), the judging portion (85) of actuations calculates an allowable actuation range, which is a combination of the toe angles $\alpha_L$ and $\alpha_R$ of the left-and-right rear wheels depending on vehicle speed VS, and judges whether the actuation of the motor (31$_L$, 31$_R$) is suitable for the turning of a vehicle or not depending on whether the actual toe angles $\alpha_L$ and $\alpha_R$ is within the allowable actuation range or not.

6 Claims, 8 Drawing Sheets

VEHICLE CONTROL SYSTEM AND METHOD FOR JUDGING ABNORMALITY IN VEHICLE CONTROL SYSTEM

TECHNICAL FIELD

The present invention relates to a vehicle control system for controlling the turning of a vehicle. In particular, the present invention relates to the vehicle control system for controlling the turning of a vehicle by cooperative movement of a plurality of actuators, and a method for judging an abnormal actuation in the vehicle control system.

BACKGROUND FIELD

A rear wheel toe angle alteration control unit, a distribution control system for braking power, a distribution control system for driving power, or the like has been already known as the vehicle control system for controlling the turning of a vehicle. This kind of vehicle control system is, in general, provided with a plurality of actuators such as each motor for the rear wheel toe angle alteration, a sensor for inspecting the actuation of each wheel brake such as rear wheel toe angle sensor, or wheel speed sensor so as to watch the actuation of motors or wheel brakes.

In a case where a plurality of control units are included in the vehicle control system for controlling the turning of a vehicle, the technology for compensating the control of abnormal control unit, in which an abnormal actuation of one control unit makes the other's actuation to alter, has been already known. (Patent Literature 1) [Patent Literature 1] Japanese Patent Unexamined Laid-open Publication No. 142, 893 of Heisei 8.

However, the conventional vehicle control system is only for watching each actuator as a controlled object, for example, only for watching the following to a target toe angle of a rear wheel actual toe angle or a presence of adhesive conditions. That is, in the conventional vehicle control system, left-and-right rear wheel actual toe angle could not be judged as the normal actuation in the cooperative actuation range according to driving conditions of a vehicle. Thus, the abnormal actuation will not be judged as taken into consideration of one value of the left-and-right rear wheel actual toe angle to the other value thereof. Therefore, the control of the rear wheel toe angle will not be judged to be abnormal as a whole vehicle body, even if it goes beyond a normal range.

The conventional vehicle control system is adapted to stop the anti-locking control and the distribution control for braking power on inspecting an abnormal condition of wheel speed in the distribution control unit for braking power. However, the abnormal actuation of wheel brake, hydraulic supply to the wheel brake, and hydraulic pressure unit as a controlled object will not be judged, based on whether the cooperative actuation range of wheel brake of the left-and-right wheel speed at turning a vehicle is within a normal range.

Therefore, an object of the present invention is to provide a vehicle control system for solving the above problem and a method for judging the abnormal actuation in the vehicle control system.

To solve the problem, the invention according to a first aspect, provides a control means of first and second actuators, an inspection means of actuation data of the first and second actuators, a judging means of actuation of the first and second actuators on the basis of the actuation data obtained by the inspection means. The judging means has a reference value fixing the actuation range of the first and second actuators to the prescribed vehicle movement to judge the abnormal condition of the actuation of the first and second actuators according to the reference value.

According to the first aspect, the judging means has a reference value fixing the actuation range of the first and second actuators to the prescribed vehicle movement to judge the abnormal actuation of the first and second actuators according to the reference value.

In the invention according to a second aspect, the first and second actuators are actuators for respectively and independently changing toe angles of the left-and-right wheel provided in a vehicle in the vehicle control system described in the first aspect. The actuating data is the left-and-right rear wheel actual toe angles, the reference value being within an actuation range of the left-and-right rear wheel toe angles fixed by vehicle speed.

According to the second aspect, the actuation range, which is a reference value of the abnormal judgment of the left-and-right rear wheel toe angles, is fixed according to vehicle speed to judge the abnormal actuation of the first and second actuators according to the reference value.

In the invention according to a third aspect, the judging means judges the abnormal actuation of the first and second actuators in reference to the reference value according to vehicle speed and front wheel steering angle in the vehicle control system described in the first and second aspects.

According to the third aspect, the judging means can judge the abnormal actuation of the first and second actuators in reference to the reference value according to vehicle speed and front wheel steering angle.

In the invention according to a fourth aspect, the invention is provided with a control unit of the first and second actuators, and an inspection sensor for inspecting the actuating data of the first and second actuators. The control unit has a judging portion of actuations of the first and second actuators by the actuation data inspected by the inspection sensor of the actuation. The judging portion has a reference value fixing the actuation range of the first and second actuators to the prescribed vehicle movement to judge the abnormal actuation of the first and second actuators according to the reference value.

According to the fourth aspect, the judging portion has a reference value fixing the actuation range of the first and second actuators to the prescribed vehicle movement to judge the abnormal actuation of the first and second actuators according to the reference value.

In the invention according to a fifth aspect, the first and second actuators are actuators for respectively and independently changing the left-and-right rear wheel toe angles provided in a vehicle in the vehicle control system described in the fourth aspect. The actuation data is left-and-right rear wheel actual toe angle, the reference value being within the actuation range of the left-and-right rear wheel toe angles fixed according to vehicle speed.

According to the fifth aspect, the actuation range of the left-and-right rear wheel toe angles, which is a reference value of the abnormal judgment, is fixed according to vehicle speed to judge the abnormal actuation of the first and second actuators on the basis of the reference value.

In the invention according to a sixth aspect, the judging portion judges the abnormal actuation of the first and second actuators in reference to a reference value according to vehicle speed and front wheel steering angles in the vehicle control system described in the fifth aspect.

According to the sixth aspect, the judging portion judges the abnormal actuation of the first and second actuators in reference to the reference value according to vehicle speed and front wheel steering angle.

In the invention according to a seventh aspect, the invention is a method for judging the abnormal actuation of the vehicle control system providing with the first and second actuators for respectively and independently changing the left-and-right rear wheel toe angles provided in a vehicle and controlling the turning of a vehicle, a control unit of the first and second actuators, and an inspection sensor of the actuating data of the first and second actuators. The invention is characterized in that the control unit has a reference value fixing an actuation range of the first and second actuators to the prescribed vehicle movement to judge the abnormal actuation of the first and second actuators according to the actuating data obtained by the inspection sensor and the reference value.

According to the seventh aspect, the control unit has a reference value fixing the actuation range of the first and second actuators to the prescribed vehicle movement to judge the abnormal actuation of the first and second actuators on the basis of the reference value.

In the invention according to an eighth aspect, the actuation data is left-and-right rear wheel actual toe angles in the method for judging the abnormal actuation described in the seventh aspect. The reference value is characterized by being the actuation range of the left-and-right rear wheel toe angles according to vehicle speed.

According to the eighth aspect, the actuation range of the left-and-right rear wheel toe angle in the control unit, which is a reference value of the abnormal judgment, is fixed according to vehicle speed to judge the abnormal actuation of the first and second actuators on the basis of the reference value.

The invention according to a ninth aspect is characterized by judging the abnormal actuation of the first and second actuators in reference to the reference value on the basis of vehicle speed and front wheel steering angles in a method for judging the abnormal actuation described in the eighth aspect.

According to the ninth aspect, the control unit can judge the abnormal actuation of the first and second actuators in reference to the reference value on the basis of vehicle speed and front wheel steering angles.

According to the invention described in the first and fourth aspects, as the invention is so constituted to judge the abnormal actuation of the first and second actuators on the basis of both the actuation ranges of the first and second actuators for controlling the turning of a vehicle, the normal actuation of cooperative movement can be judged as a whole vehicle body.

In particular, according to the invention described in the second and fifth aspects, as a presence of the abnormal actuation of the first and second actuators for controlling the left-and-right rear wheel toe angles can be judged, depending on whether the left-and-right rear wheel actual toe angle is within the actuation range of the left-and-right rear wheel toe angles fixed according to vehicle speed or not, a performance of turning control can be correctly judged in order to maintain a normal condition as a vehicle control system for controlling the turning.

According to the invention described in the third and sixth aspects, a performance of turning control according to vehicle speed and front wheel steering angle by the rear wheel toe angle can be judged to be normal or not, in a vehicle control system for fixing the rear wheel toe angle on the basis of vehicle speed and front wheel steering angle.

According to the invention described in the seventh aspect, as the abnormal actuation of the first and second actuators is judged on the basis of both the actuation ranges of the first and second actuators for respectively and independently changing the rear wheel toe angles provided in a vehicle and controlling the turning of a vehicle, the normal actuation of cooperative movement can be correctly judged as a whole vehicle body to be normal or not.

In particular, according to the invention described in the eighth aspect, as a presence of the abnormal actuation of the first and second actuators for controlling the left-and-right rear wheel toe angles can be judged, depending on whether the left-and-right rear wheel actual toe angles is within the actuation range of the left-and-right rear wheel toe angles fixed according to vehicle speed or not, a performance of turning control can be correctly judged as a whole vehicle body in order to maintain a normal condition.

Furthermore, according to the invention described in the ninth aspect, the normal performance of turning control can be correctly judged on the basis of vehicle speed and front wheel steering angle by the rear wheel toe angle in the vehicle control system fixing the rear wheel toe angle according to vehicle speed and front wheel steering angle.

Figure 2:
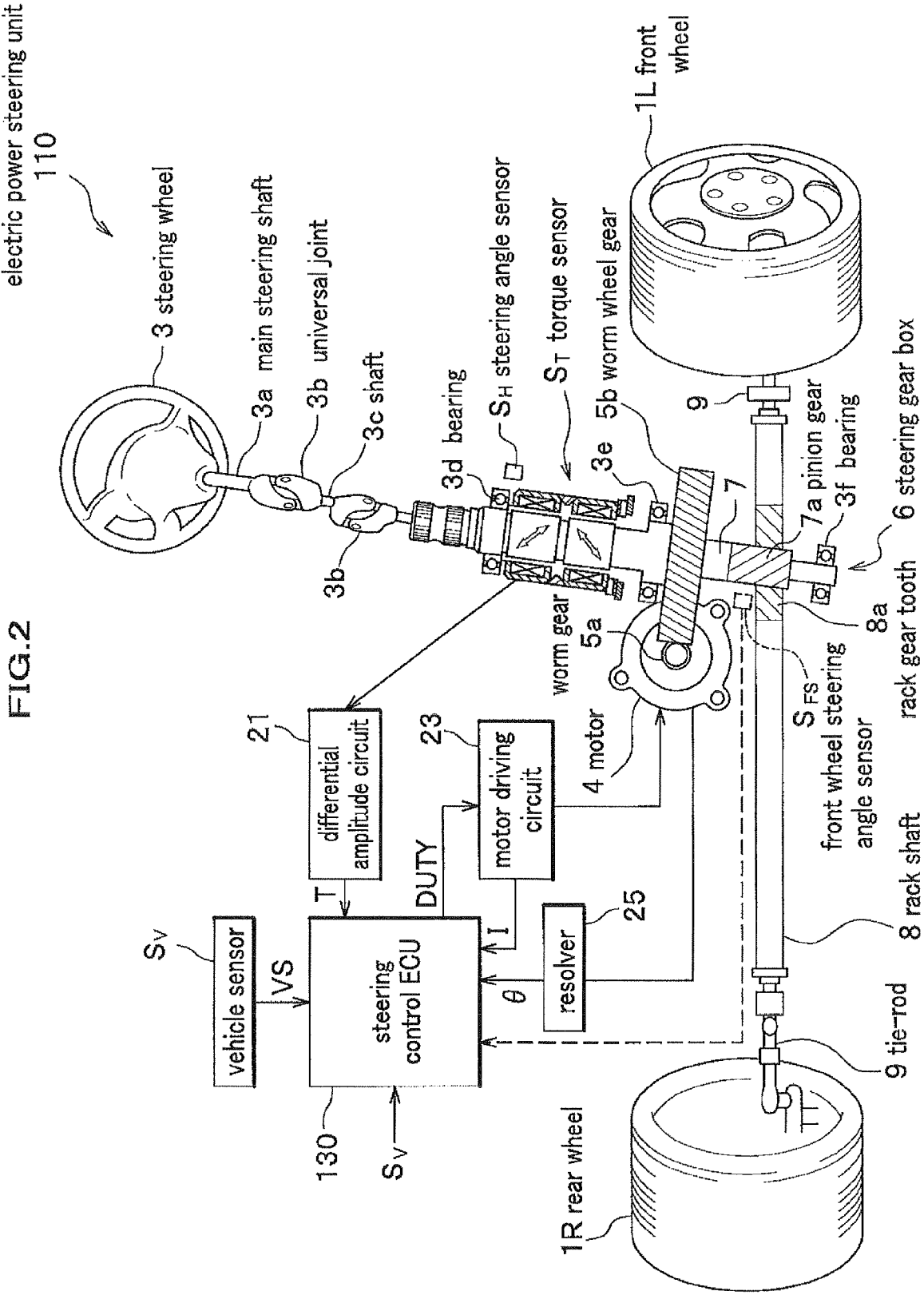

A general view of four wheel automobile providing with a steering system including a toe angle alteration unit relating to an embodiment of the present invention FIG. 2

A view of an electric power steering unit of the steering system

FIG. 3

A view of the toe angle alteration unit in the side of the left rear wheel of the steering system

FIG. 4

A schematic cross-sectional view showing a constitution of an actuator of the toe angle alteration unit

FIG. 5

A schematic view of control function of a steering control ECU and a toe angle alteration ECU of the steering system

FIG. 6

A block diagram of control function of the toe angle alteration control ECU

FIG. 7

A flowchart showing a flow of control after the reception of the normal judgment in the actuation judging portion and in the steering control ECU

FIG. 8

(a) is a view explaining the definitions of positive and negative directions of toe angles $\alpha_L$, $\alpha_R$ of the left-and-right rear wheels, (b) is a view explaining the allowable actuation ranges Rp of toe angles $\alpha_L$, $\alpha_R$ of the rear wheels, and (c) is a view explaining a method for fixing as being different from the above (b) of the allowable actuation range Rp

BEST MODE FOR CARRYING OUT THE INVENTION

Embodiment

An embodiment of the present invention will be explained with reference to FIG. 1 to FIG. 6.

Figure 1:
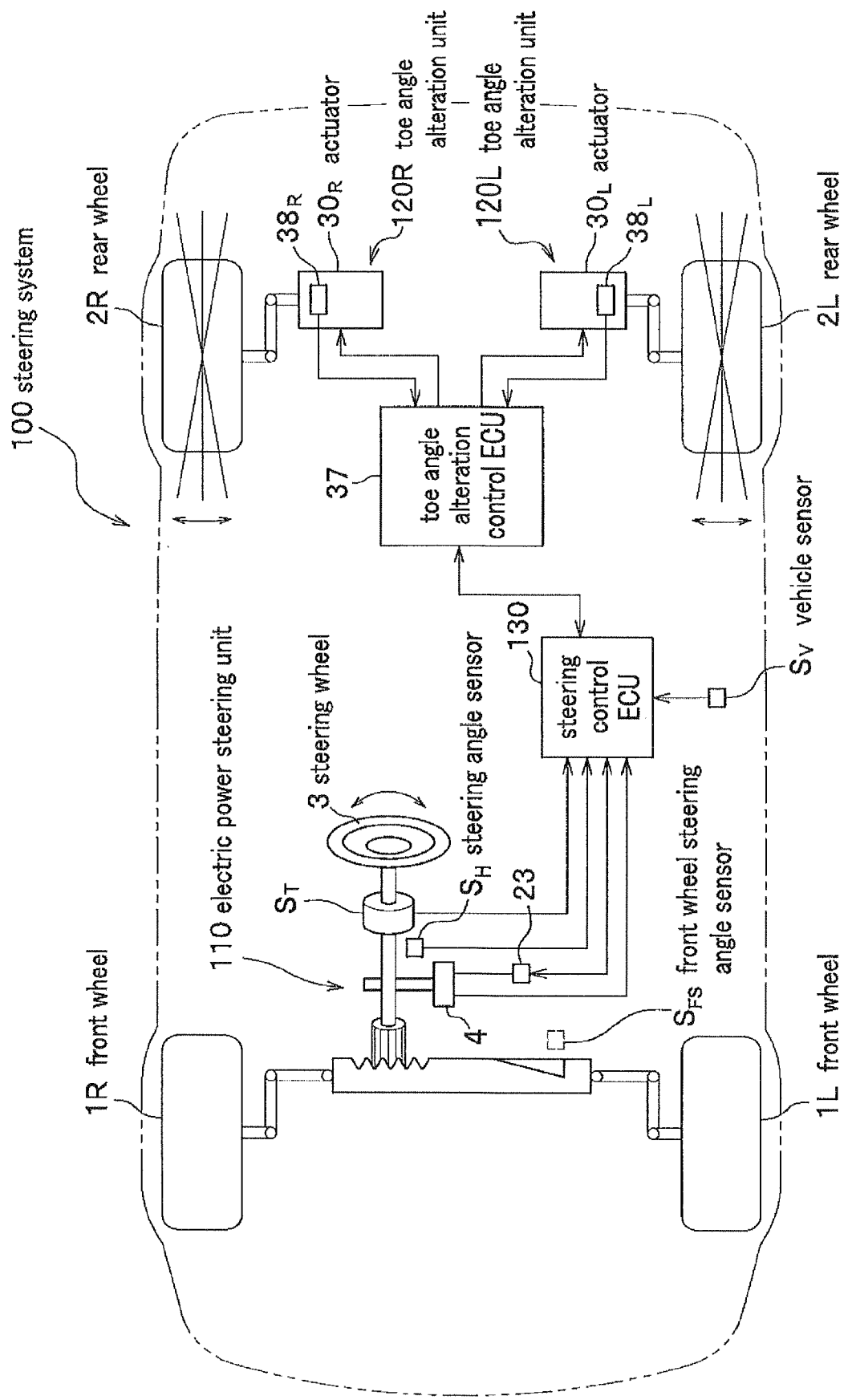
FIG. 1

FIG. 1 is a general view of four wheel automobile providing with a steering system, as one example of vehicle control system, relating to an embodiment of the present invention. FIG. 2 is a view of an electric power steering unit.

As shown in FIG. 1, a steering system (vehicle control system) 100 is constituted by comprising an electric power steering unit 110 assisting the steering of a steering wheel 3 of front wheels 1L, 1R by means of a motor 4, toe angle alteration units 120L, 120R including actuators (first and second actuators) 30L, 30R for altering toe angles of rear wheels 2L, 2R, a toe angle alteration control unit (hereinafter referred to as a toe angle alteration control ECU) 37 for respectively and independently controlling the rear wheel toe angle by the control of the toe angle alteration unit 120L, 120R according to the front wheel steering angle and vehicle speed, a steering control unit 130 (hereinafter referred to as a steering control ECU) controlling the toe angle alteration control ECU 37 and an electric power steering unit 110, a steering angle sensor SH, a vehicle speed sensor Sv, and the like. In the above, the toe angle alteration control ECU 37 or the steering control ECU 130 corresponds to a control means or a control unit of the present invention.

(Electric Power Steering Unit)

As shown in FIG. 2, in the electric power steering unit 110, a main steering shaft 3a having a steering wheel, a shaft 3c, and a pinion axis 7 are coaxially connected by two universal joints (flexible joints) 3b. A pinion gear 7a provided in the lower end of the pinion gear 7 engages with a rack gear tooth 8a of a rack shaft 8 as being reciprocating and movable in the width of a vehicle body. Either end of the rack shaft 8 is connected through tie-rod 9, 9 to a left-and-right front wheel 1L, 1R, respectively. In this constitution, the electric power steering unit 100 can change a driving direction of a vehicle at an operation of the steering wheel 3. The rack shaft 8, the rack gear tooth 8a, and the tie-rods 9, 9 construct a steering mechanism. In the above, the pinion shaft 7 is supported on a steering gear box 6 through bearings 3d, 3e, 3f at an upper, a middle, and a lower portions thereof.

The electric power steering unit 110 is provided with a motor 4 supplying an assist steering power for relieving the steering power by the steering wheel 3. A worm gear 5a provided in an output shaft of the motor 4 engages with a worm wheel gear 5b provided in the pinion shaft 7.

The worm gear 5a and the worm wheel gear 5b constitute a gear-reducing mechanism. A rotor of the motor 4, the worm gear 5a connected to the motor 4, the worm wheel gear 5b, the pinion shaft 7, the rack shaft 8, the rack gear tooth 8a, the tie-rods 9, 9 and the like constitute a steering system.

The motor 4 is three-phase brushless motor comprising a stator (as not shown) with a plurality of magnetic coils and a rotor (as not shown) rotating inside the stator to convert electric energy to mechanical energy.

The electric power steering unit 110 is provided with a motor driving circuit 23 driving a motor 4, a resolver 25 for inspecting a rotating angle of the motor 4, a torque sensor $S_T$ for inspecting a pinion torque applied to the pinion shaft 7, a steering angle sensor $S_H$ for inspecting a rotating angle of the pinion shaft 7, a differential amplitude circuit 21 for amplifying an output of the torque sensor $S_T$, and a vehicle speed sensor Sv for inspecting the speed of a vehicle (vehicle speed).

A steering control ECU 130 of the steering system 100 has an electric power steering control section 130a (as referred to FIG. 5) as describing later. The electric power steering control section 130a controls the drive of the motor 4 which is functional section of the electric power steering unit 110.

A motor driving circuit 23 is provided with, for example, a plurality of switching elements like three-phase FET bridge circuit to generate a rectangular wave voltage with use of DUTY signal (DU, DV, DW) from the electric power steering control section 130a, and thus to drive the motor 4.

The motor driving circuit 23 is provided with a function for inspecting an electric current of three-phase motor with use of a hall element as not shown.

The vehicle speed sensor Sv inspects a vehicle speed as a number of pulses per hour to output vehicle speed signal Vs.

Hereinafter, the vehicle speed signal Vs will be called as vehicle speed Vs. In a functional constitution of the steering control ECU 130, the control of the electric power steering unit 110 and the control of the toe angle alteration units 120L, 120R will be inclusively described later.

(A Toe Angle Alteration Unit)

The constitution of the toe angle alteration unit will be explained with reference to FIG. 3 and FIG. 4.

Figure 3:
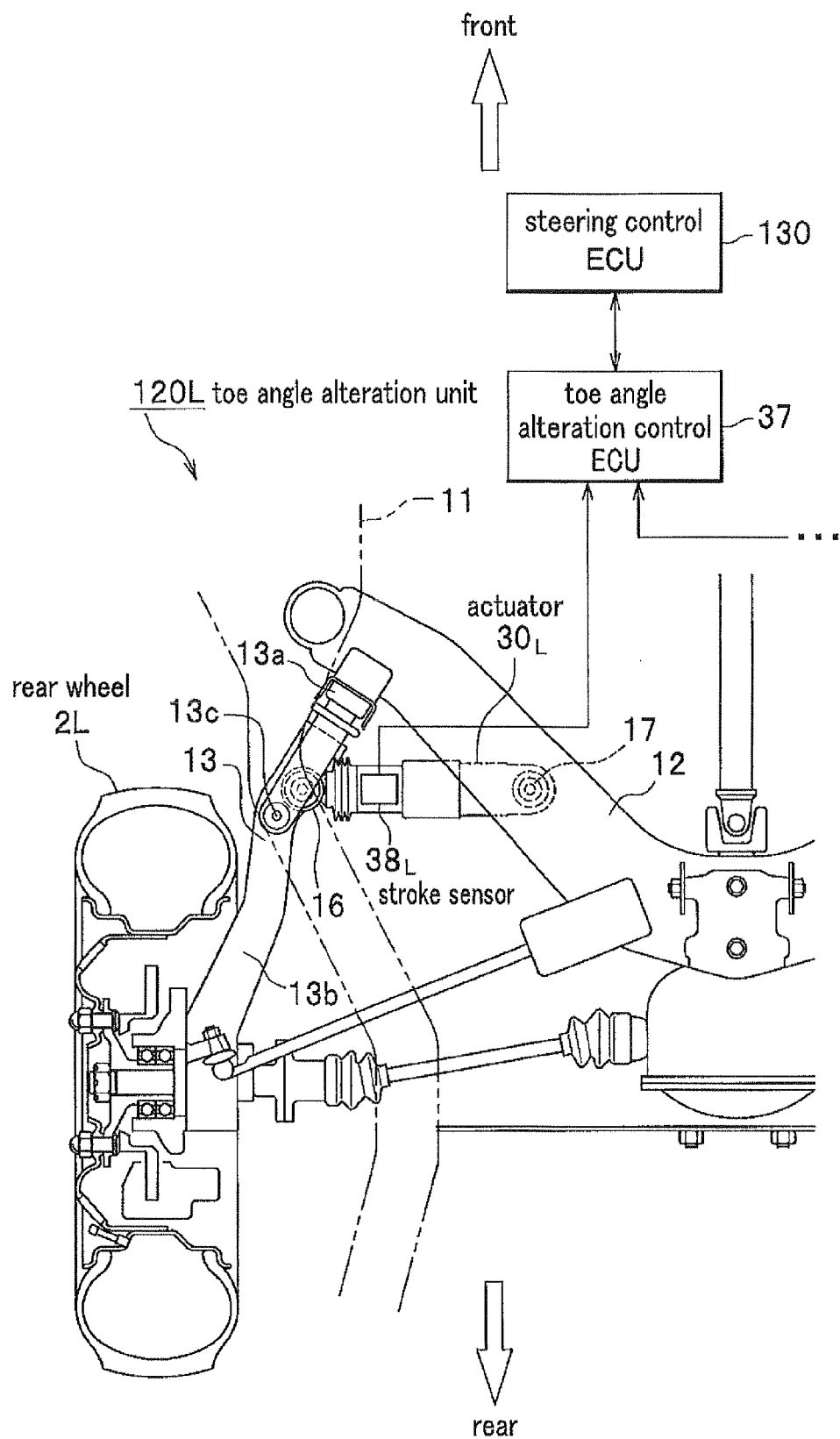
Figure 4:
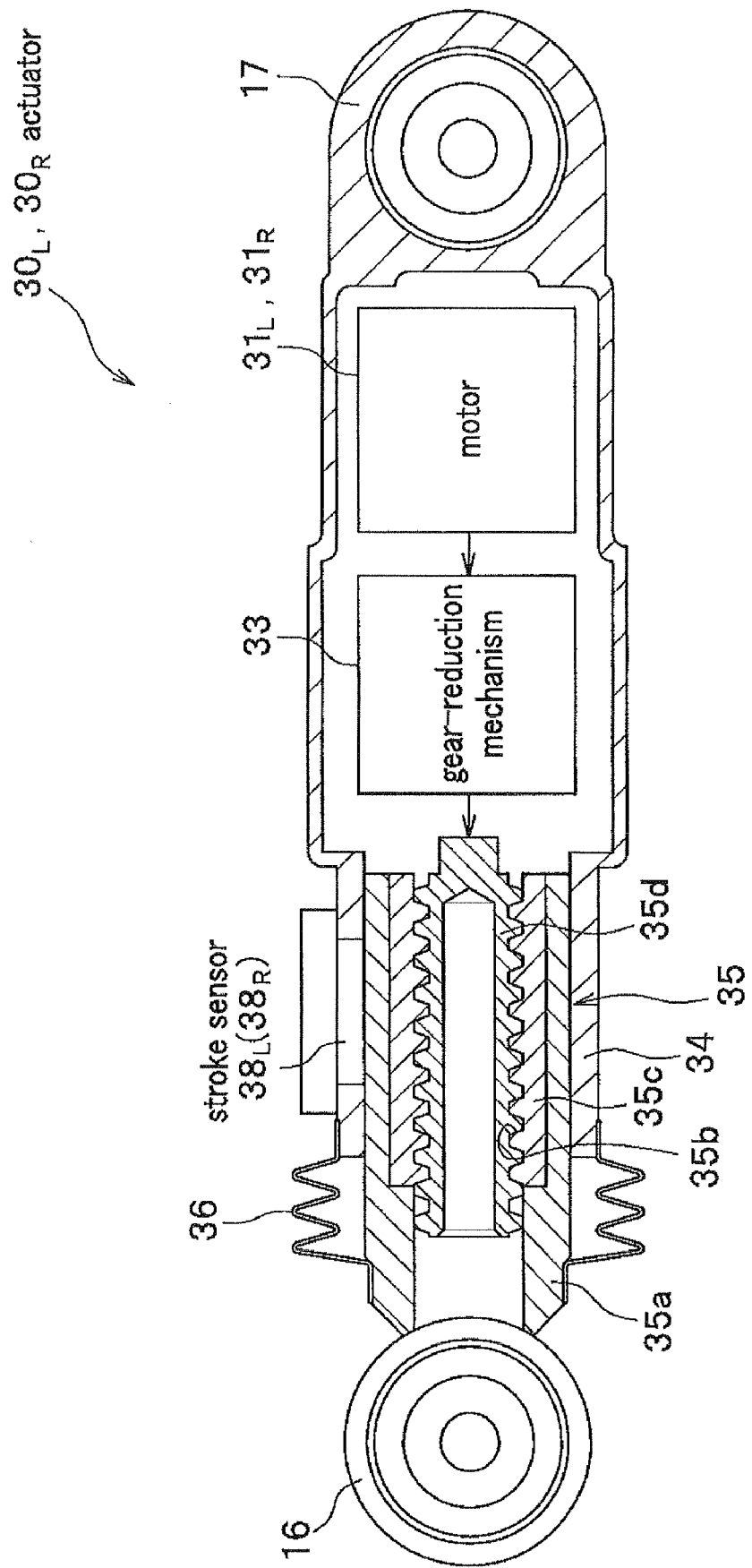

FIG. 3 is a plan view of the toe angle alteration unit of left rear wheel, and FIG. 4 is a schematic cross-sectional view showing a constitution of the actuator of the toe angle alteration unit.

The toe angle alteration units 120L, 120R are respectively installed in the left-and-right rear wheels 2L, 2R of a vehicle. FIG. 3 shows a toe angle alteration unit 120L as an example of the left rear wheel 2L. The toe angle alteration unit 120L is provided with an actuator $30_L$ and a stroke sensor $38_L$.

Although FIG. 3 shows only a left rear wheel 2L, a right rear wheel 2R is also attached (in symmetry). As for the right rear wheel, it is renamed by the toe angle alteration unit 120R, an actuator $30_R$, and a stroke sensor $38_R$. Herein, the stroke sensors $38_L$, $38_R$ correspond to an inspection means of the actuation or an inspection sensor of the actuation.

A lateral end of a cross-member 12 extending lateral approximately to a rear-side frame 11 of a vehicle body is elastically supported. A front end of a trailing arm 13 extending approximately in the front and rear direction is supported near the lateral end of the cross-member 12. The rear wheel 12L is fixed to the rear end of trailing arm 13.

The trailing arm 13 is constituted to connect a body-side arm 13a, as attached to the cross member 12, to a wheel-side arm 13b, as attached to the rear wheel 2L, through a rotating shaft 13c extending approximately in a vertical direction. Thus, the trailing arm 13 can displace in the lateral direction.

As for an actuator 30L, one end thereof is attached to the front-side end from the rotating axis 13c of the wheel-side arm 13b through a ball-joint 16, and the other end thereof is attached through a ball-joint 17 to the cross-member 12.

As shown in FIG. 4, the actuator $30_L$ is provided with a motor $31_L$, a gear reduction mechanism 33, a feed screw section 35, and the like.

The motor $31_L$ is constituted by a brush motor, a brushless motor, etc. as being rotatable in the clockwise or counter-clockwise direction. The gear-reduction mechanism 33 is constituted by e.g. a combination of two-stage planetary gear (as not shown).

The feed screw section 35 is provided with a cylindrical rod 35a, a cylindrical nut 35c as inserted in the rod 35a and forming a screw channel 35b in an inner side thereof, and a screw shaft 35d as axially and movably supporting the rod 35a by an engagement with the screw channel 35b.

The feed screw section 35, together with the gear-reduction mechanism 33 and the motor 31L, is housed in the case body 34 as formed to be slender and approximately cylindrical. A boots 36 is mounted to cover the space between an end of the case body 34 and an end of the rod 35a in the side of the feed screw section 35 of the case body 34. Thus, it is designed to prevent from an accumulation of dust or waste on an outer surface of the rod 35a exposing from an end of the case body 34 and to prevent from a leak-in of outside dust, waste, or water in the case body 34.

One end of the gear-reduction mechanism 33 is connected to an output shaft of the motor $31_L$, and the other end is connected to the screw shaft 35d. The power from the motor $31_L$ is transferred through the gear-reduction mechanism 33 to the screw shaft 35d. As a result, the rotation of the screw shaft 35d is designed to actuate the rod 35a expandably in a left-and-right direction (in an axial direction) shown in figure to the case body 34. The friction due to the engagement between the screw shaft 35d and the screw channel 35b of the nut 35c will keep the rear wheel toe angle to be constant values even in the non-actuating state of the motor $31_L$.

The actuator $30_L$ is provided with a stroke sensor 38L inspecting a position (value of expansion) of the rod 35a. The stroke sensor $38_L$ is designed, for example, to store the magnet therein to inspect a position thereof with use of magnetic force. Thus, the way for inspecting the position by means of the stroke sensor $38_L$ can inspect separately and high-accurately the actual toe angle (actuation data) of the rear wheel 2L, 2R.

In such an actuator $30_L$, the ball joint 16 attached at a top of the rod 35a is rotatably connected to the wheel-side arm 13b (as shown in FIG. 3) of the trailing arm 13. The ball joint 17 attached at a base (right-side end in FIG. 4) of the case body 34 is rotatably connected to the cross-member 12 (as shown in FIG. 3). When the motor $31_L$ actuates to rotate the screw shaft 35d to expand the rod 35a (left-side direction in FIG. 4), the wheel-side arm 13 b is urged by pressure toward the outside of lateral direction (left-side direction in FIG. 3) to turn the rear wheel 2L in the left-side direction. On the other hand, the shrinkage of the rod 35a draws the wheel-side arm 13b toward the inside of the lateral direction (right-side direction in FIG. 3), thus to turn the rear wheel 2L in the right-side direction.

The position where the ball joint 16 of the actuator 301, is attached, is not limited to the wheel-side arm 13b in case of the convertible position of toe angle of the rear wheel 2L such as knuckle. In this embodiment, although the toe angle alteration units 120L, 120R are applied to the suspension of the semi-trailing-arm type of independent suspension, it is not limited to this example and can be applied to the other suspension type. For example, it can be realized by assembling the actuator $30_L$ in a side rod of double wishbone suspension or strut suspension therein. As for the right rear wheel 2R, the actuator $30_L$, the motor $31_L$, or the stroke sensor 38L is, respectively, renamed by an actuator $30_R$, a motor $31_R$, or a stroke sensor $38_R$ in FIG. 4.

The toe angle alteration control ECU 37 controlling the actuator 30L, 30R is attached in the body-side. The toe angle alteration control ECU 37 is connected through three-phase power wiring to the motor 31L, 31R and connected by signal lines through connector and the like to the stroke sensor 38L, 38R. The passage between the toe angle alteration control ECU 37 and the steering control ECU 130 is connected through communication lines.

To the toe angle alteration control ECU, an electric power is supplied from a power source such as battery (as not shown) in the vehicle. To the steering control ECU 130 and the motor driving circuit 23, an electric power is respectively supplied from a power source such as a battery through a different line from the above wiring (as not shown).

(Steering Control ECU)

Next, the function of the steering control ECU will be described with reference to FIG. 5.

Figure 5:
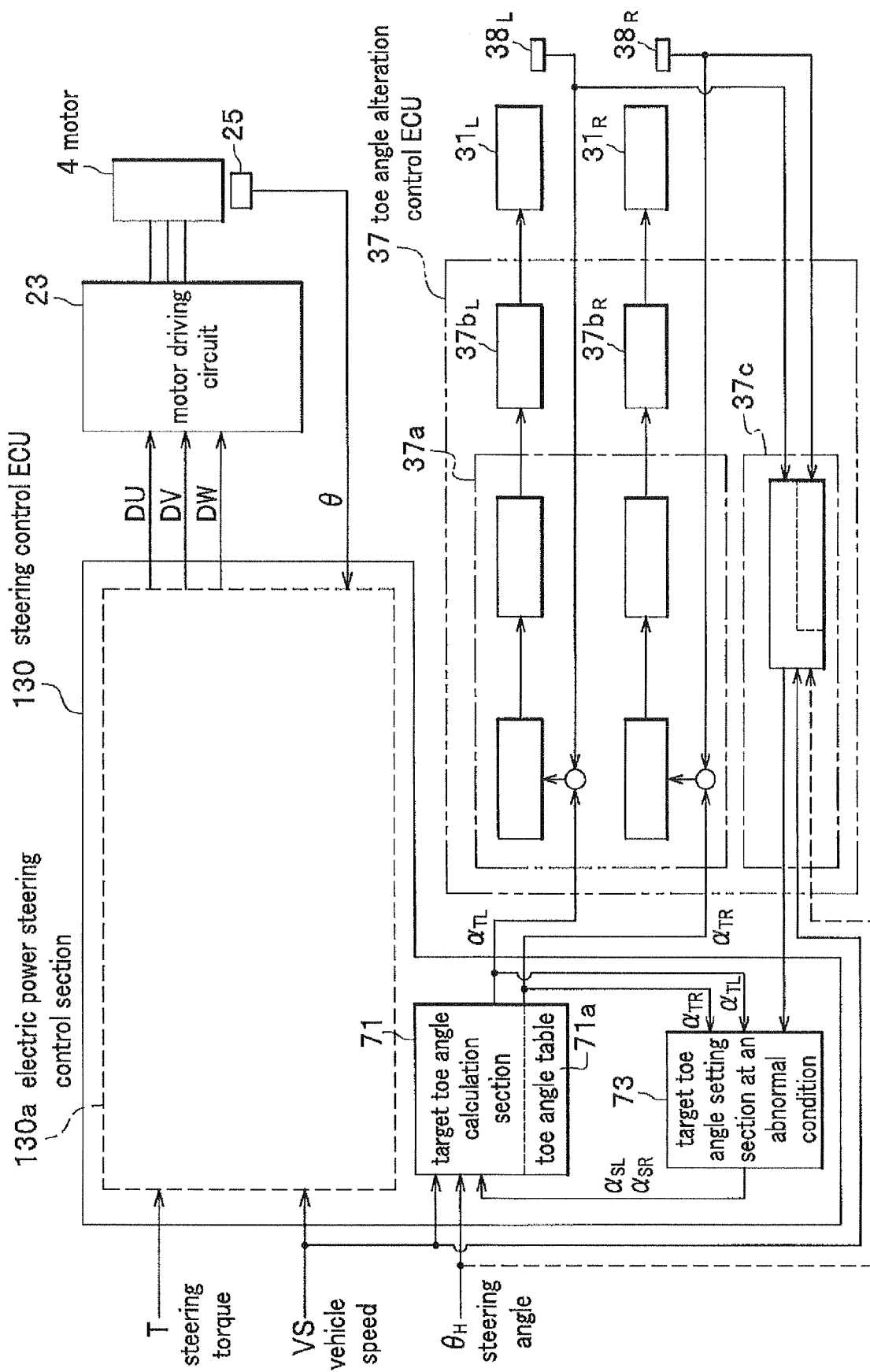

FIG. 5 is a view of schematic control function of the steering control ECU and the toe angle alteration control ECU of the steering system.

The steering control ECU 130 is constituted by a microcomputer with CPU, ROM, RAM (as not shown) etc., its peripheral circuits and the like.

As shown in FIG. 5, the steering control ECU 130 is provided with an electric power steering control section 130a controlling the electric power steering unit 110, a target toe angle calculation section 71 calculating the target value of the toe angle of the rear wheel 2L, 2R, and the target toe angle designating section 73 at the time of an abnormal condition.

(Electric Power Steering Control Section)

The electric power steering control section 130a designates a target electric current signal for controlling the motor 4 as shown in FIG. 2 of the Japanese Patent Unexamined Laid-Open publication No. 2002-59855, although a detailed description is omitted. Then, the control section 130a corrects-in-inertia and corrects-in-damping the above target signal, and then outputs DUTY signal (DU, DV, DW) to the motor driving circuit 23 through the feedback control of output electric current of the motor driving circuit on the basis of the above amended target electric current.

(Target Toe Angle Calculation Section)

Next, the target toe angle calculation section will be described with reference to FIG. 5.

The target toe angle calculation section 71 generates the target toe angle aTL, a TR of the left-and-right rear wheel 2L, 2R, respectively, according to vehicle speed VS and steering angle $\theta_H$ of the steering wheel 3, and inputs the target toe angle $\alpha_{TL}$, $\alpha_{TR}$ in the toe angle alteration control ECU 37 controlling each toe angle alteration of the left-and-right rear wheel 2L, 2R. The generation of the target toe angle $\alpha_{TL}$, $\alpha_{TR}$ is referred to and performed on the basis of a toe angle table 71a pre-designating in each of the left-and-right rear wheels 2L, 2R according to the steering angle $\theta_H$, and vehicle speed VS.

In addition, angular velocity $\omega_H$ is obtained by differentiation of the steering angle $\theta_H$ in the target toe angle calculation section 71.

For example, the angular velocity is defined as the next expressions (1) and (2).

$$\alpha_{TL} = K_L(VS, \omega_H, \theta_H) \cdot \theta_H \tag{1}$$

$$\alpha_{TR} = K_R(VS, \omega_H, \theta_H) \cdot \theta_H \tag{2}$$

where $K_L(VS, \omega_H, \theta_H)$ and $K_R(VS, \omega_H, \theta_H)$ mean vehicle speed VS, steering angle $\theta_H$ and steering ratio of the front and rear wheel depending on the angular velocity $\omega_H$. In the prescribed range of low vehicle speed, the target toe angle $\alpha_{TL}$, $\alpha_{TR}$ of the rear wheel makes inverse in phase the rear wheel 2L, 2R according to the steering angle $\theta_H$ of the steering wheel 3 to generate the target toe angle $\alpha_{TL}$, $\alpha_{TR}$ of each rear wheel so as to turn easily at a small radius.

In the range of high vehicle speed beyond the prescribed range of low vehicle speed, the target toe angle $\alpha_{TL}$, $\alpha_{TR}$ of each rear wheel is designated in the same phase according to the steering angle $\theta_H$, in case that the absolute value of the angular velocity $\omega_H$ is less than or equal to the prescribed value and a steering angle $\theta_H$ is within the left-and-right prescribed range. Namely, the target toe angle $\alpha_{TL}$, $\alpha_{TR}$ of each rear wheel is set in order to make the side slip angle β smaller in changing a lane.

However, in the high vehicle speed beyond the prescribed low vehide speed, the target toe angle $\alpha_{TL}$, $\alpha_{TR}$ of each rear wheel is set to be inverse in phase according to steering angle $\theta_H$, in case that the absolute value of the angular velocity $\omega_H$ is beyond the prescribed value or the steering angle $\theta_H$ is a larger steering angle beyond the left—and-right prescribed range.

In addition, the target toe angle $\alpha_{TL}$, $\alpha_{TR}$ generated at the target toe angle calculation section 71 does not necessarily follow a geometry of Ackerman and Jeantaud from the point of whirling-stability view. Each of the target toe angle $\alpha_{TL}$, $\alpha_{TR}$ may be a designated value, e.g. 2 degrees, of toe-in, in case that the steering angle $\delta_H$ is zero degree.

(Target Toe Angle Setting Section at the Time of Emergency)

Next, the target toe angle setting section at the time of abnormal actuation will be described with reference to FIG. 5.

The target toe angle setting section 73 at the time of abnormal actuation inputs a signal of the target toe angle $\alpha_{TL}$, $\alpha_{TR}$ from the target toe angle calculation section 71, and inputs an inspection signal of the abnormal actuation from the actuation judging portion (a judging means or a judging portion) 85, as described later, of the toe angle alteration control ECU 37. On receiving an inspection signal of the abnormal actuation, the target toe angle setting section 73 at the time of abnormal actuation inputs the pre-designated target toe angle $\alpha_{SL}$, $\alpha_{SR}$ at the time of abnormal actuation to the target toe angle calculation section 71, outputs the target toe angle $\alpha_{SL}$, $\alpha_{SR}$ at the time of abnormal actuation as a target toe angle to the toe angle alteration control ECU 37, and stops the rear wheel toe angle control according to vehicle speed VS and steering angle $\theta_H$.

(Toe Angle Alteration Control ECU)

Figure 6:
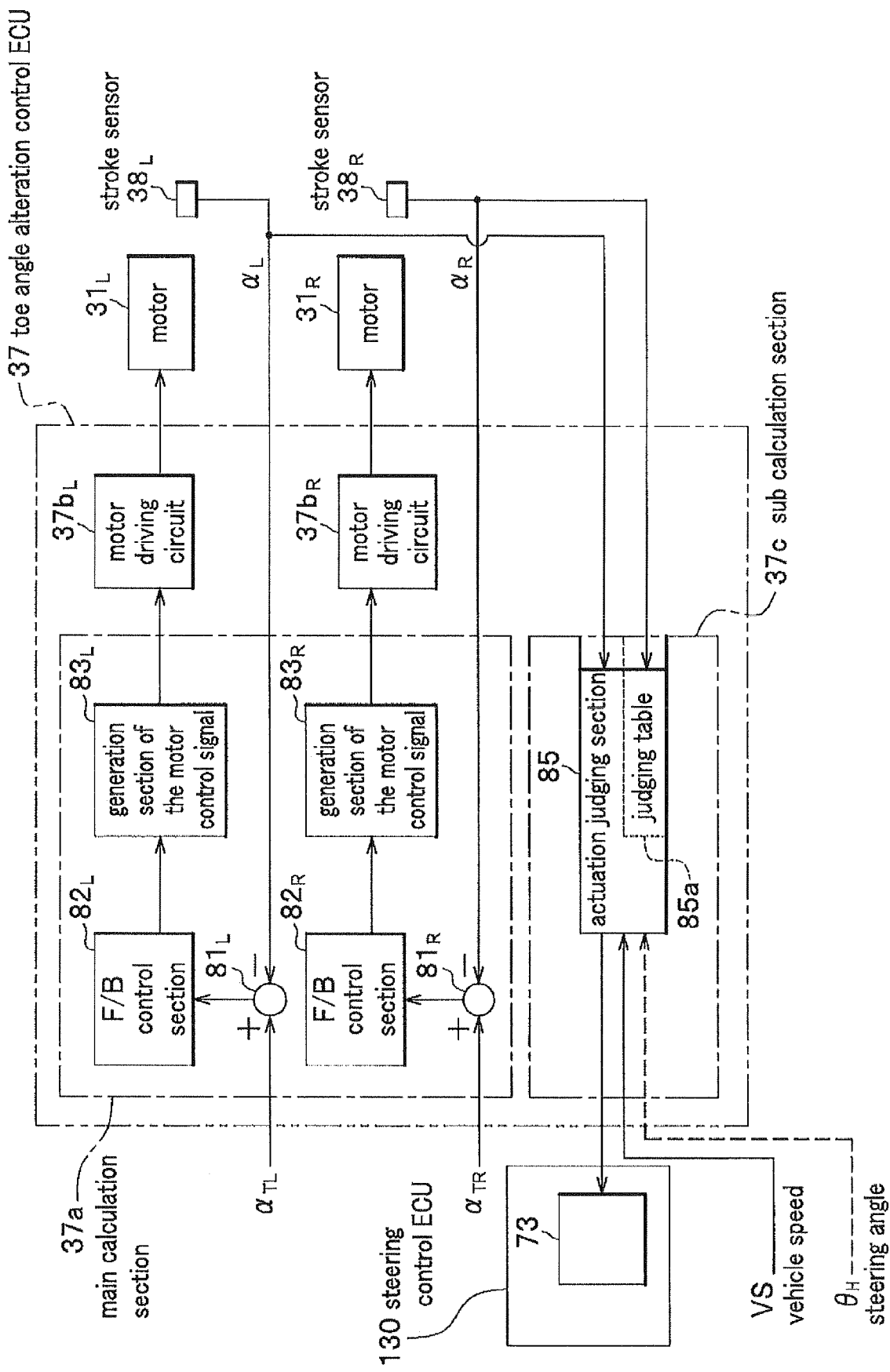

Next, the detailed constitution of the toe angle alteration control ECU will be described with reference to FIG. 6. FIG. 6 is a block diagram of the control function of the toe angle alteration control ECU of the toe angle alteration unit.

The toe angle alteration control ECU 37 includes a microcomputer with two CPUs, RAM, ROM, etc. and peripheral circuits etc., and motor driving circuits $37b_L$, $37b_R$ as a constitution of electronic units. The two CPUs correspond to a main calculation section 37a and a sub calculation section 37c as illustrated in FIG. 6 as a functional block and each of them runs a program pre-stored in the ROM.

The main calculation section 37a has a function for individually controlling the actuator $30_L$, $30_R$, that is, the motor $31_L$, $31_R$. Then, the main calculation section 73a includes a subtractor $81_L$, a feedback control section (hereinafter referred to as F/B control section) $82_L$, and a generation section of the motor control signal $83_L$ for controlling the motor 31L, and also includes a subtractor $81_R$, F/B control section $82_R$, and a generation section of the motor control signal $83_R$ for controlling the motor $31_R$.

The sub calculation section 37c includes an actuation judging portion 85.

In the following, each functional block will be described in details.

The actual toe angle $\alpha_L$ from the stroke sensor $38_L$ and the target toe angle $\alpha_{TL}$ from the target toe angle calculation section 71 of the steering control ECU 130 are inputted to subtractor $81_L$. The subtractor $81_L$ calculates the offset signal to input in a F/B control section $82_L$. The F/B control section $82_L$ generates the target electric current signal by multiplying the prescribed gain constant in the offset signal to output it to the generation section of the motor control signal $83_L$. Herein, the target electric current signal is an electric current signal for supplying the electric power to the motor $31_L$ required for setting the actuating stroke of the actuator $30_L$ (linear-stroke volume of the desired toe angle $\alpha_{TL}$ of the rear wheel 2L).

The generation section of the motor control signal $83_L$ receives a target electric current signal from the F/B control section $82_L$ to output the motor control signal to the motor driving circuit $37b_L$. The motor control signal is a signal including an electric current value supplying to the motor $31_L$ and a flowing direction of the electric current. The motor driving circuit $37b_L$ is constituted by the bridge circuits of FET (Field Effect Transistor) and the like to supply the motor electric current to the motor $31_L$ on the basis of the motor control signal.

As for the other motor $31_R$, the subtractor $81_R$, the F/B control section $82_R$, the generation section of the motor control signal $83_R$, and the motor driving circuit $37b_R$ have the same function (as the motor $31_L$) according to the actual toe angle $\alpha_R$ from the stroke sensor $38_R$ and the target toe angle $\alpha_{TR}$ from the target toe angle calculation section 71 of the steering control ECU 130.

In this way, the feedback of the actual toe angle $\alpha_L$, $\alpha_R$ to the target toe angle $\alpha_{TL}$, $\alpha_{TR}$ at the F/B control section $82_L$, $82_R$ generates a target electric current signal. Thus, the feedback control of the deviation of the electric current value, which is caused by vehicle speed VS, surface condition of roads, driving condition of a vehicle, wear of tires, etc. required for the toe angle alteration of the rear wheel 2L (or 2R) can control the target toe angle $\alpha_{TL}$, $\alpha_{TR}$ at a speed change of the desired toe angle.

Further, the actuation judging portion 85 of the sub calculation section 37c calculates a reference value in parallel with the calculation control at the main calculation section 37a in reference to the judging table 85a according to vehicle speed VS and steering angle $\theta_H$. Then, the actuation judging portion 85 compares the calculated value with the actual toe angle $\alpha_L$, $\alpha_R$ from the stroke sensor $38_L$, $38_R$ to judge whether the operation of the actuator $30_L$, $30_R$ is abnormal or normal condition. As a result of the judge, the actuation judging portion 85 outputs an inspection signal of the abnormal condition to the target toe angle setting section 73 at the time of abnormal condition of the steering control ECU 130.

This judging method will be described later.

Figure 7:
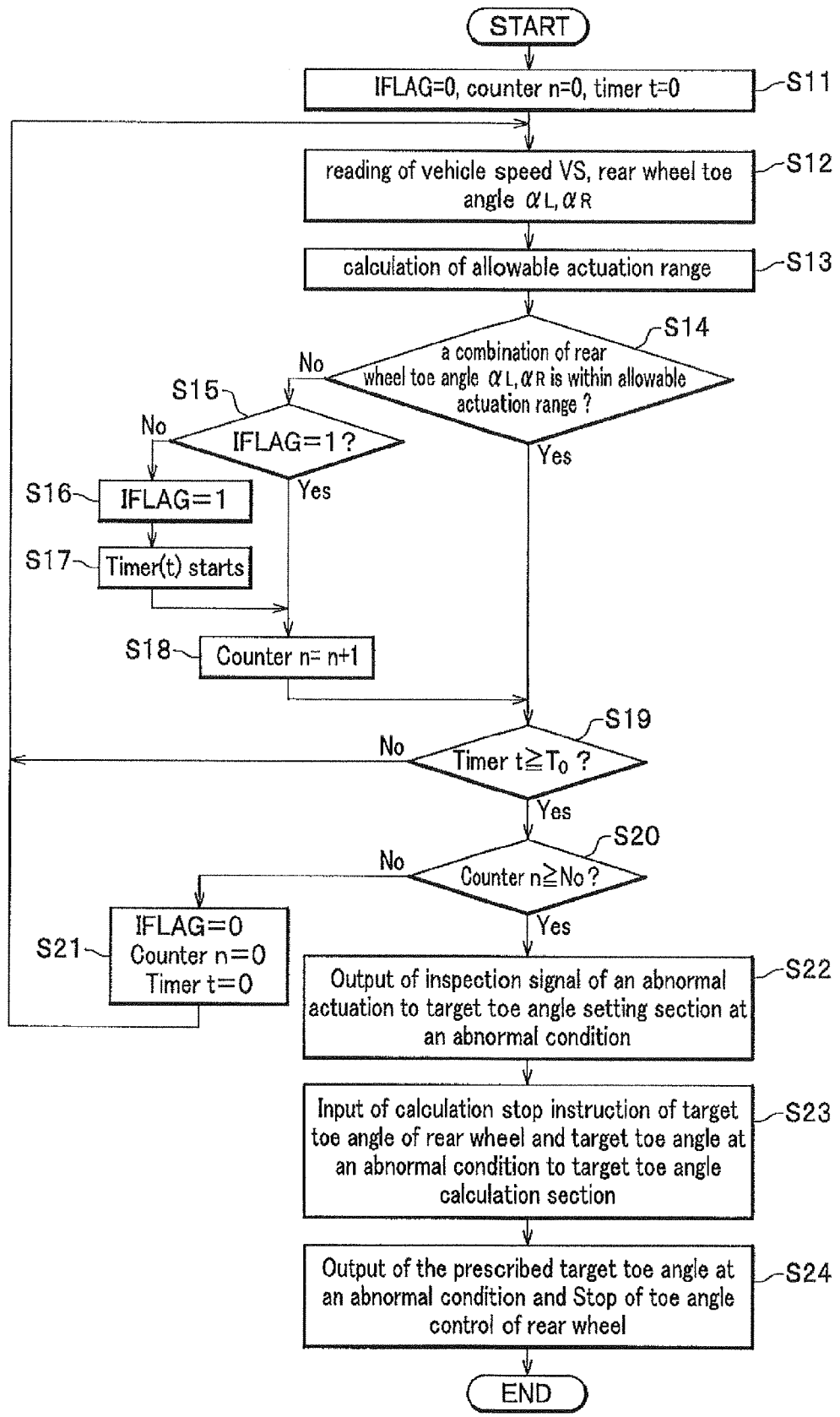

Next, a flow of the control of the abnormal judgment at the actuation judging portion will be explained with reference to FIG. 7. FIG. 7 is a flowchart showing a flow of the control after having received the abnormal judgment at the actuation judging portion and the abnormal judgment at the steering control ECU. The following flow of control will be repeated at the prescribed period, for example, at the period of 10 ms.

At step S11, the actuation judging portion 85 resets the value of an IFLAG (IFLAG=0) as an initial value, a counter (n=0), and a timer (t=0). Herein, the IFLAG is a flag for judging on whether it is within the prescribed lapse of time, after having judged that a combination of the rear wheel toe angle $\alpha_{TL}$, $\alpha_{TR}$ is not within the later-describing allowable actuation range. The counter n is a counter showing the number of repetition of judgment whether a combination of the rear wheel toe angle $\alpha_{TL}$, $\alpha_{TR}$ is not within the allowable actuation range. The timer t is a timer for counting a lapse of time after having judged that the rear wheel toe angle $\alpha_{TL}$, $\alpha_{TR}$ is not within the allowable actuation range.

At step S12, the actuation judging portion 85 reads the vehicle speed VS and the rear wheel toe angle (an actual toe angle) $a_L$, $\alpha_R$. At step S13, the actuation judging portion 85 calculates the allowable actuation range according to the vehicle speed VS.

Figure 8A:
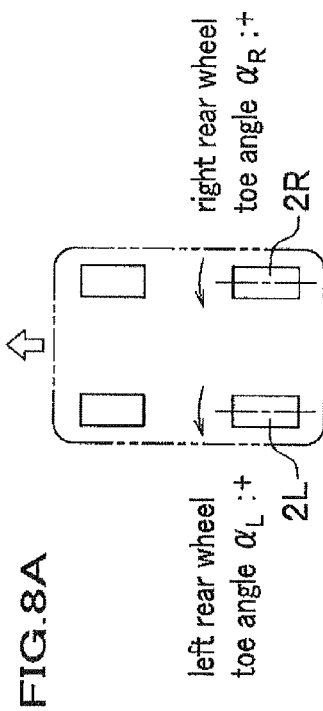
Figure 8B:
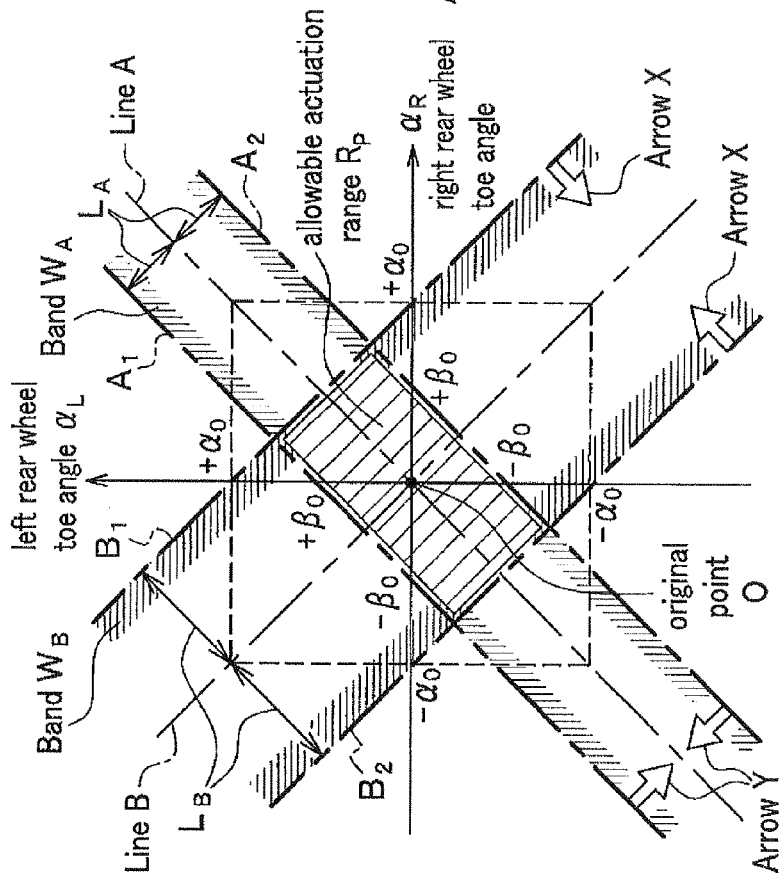

The allowable actuation range is designed to calculate the allowable actuation range Rp showing in FIG. 8(b) according to the vehicle speed VS on the basis of the data of the judging table 85a pre-stored in the ROM. At first, the left-and-right rear wheel toe angle $\alpha_L$, $\alpha_R$, as shown in FIG. 8(a), is defined such that a left direction is positive (plus) and a right direction is negative (minus). As shown in FIG. 8(b), the left rear wheel toe angle (an actual toe angle) $\alpha_L$ is supposed to be a longitudinal coordinate and the right rear wheel toe angle (an actual toe angle) $\alpha_R$ to be a vertical coordinate. A band $W_A$ may be formed to expand in either side of an oblique line (a center line of the band $W_A$) such that the oblique line thereof, which is a line A angled at 45 degrees to the plus coordinate of the right rear wheel toe angle $\alpha_R$ as shown by a dotted line, extends from the right upper side through the original point (zero point) to the left lower side in the first quadrant and the second quadrant. Each boundary line of the band $W_A$ extending parallel to the center line amounts the prescribed distance $L_A$ from the center line, respectively in the either side. Then, the band $W_B$ may be formed to expand in either side of an oblique line (a center line of the band $W_B$) such that the oblique line thereof, which is a line B angled at 135 degrees to the plus coordinate of the right rear wheel toe angle $\alpha_R$ as shown by a dotted line, extends from the left upper side through the original point (zero point) to the left lower side in the third quadrant and the fourth quadrant. Each boundary line of the band $W_B$ extending parallel to the center line amounts the prescribed distance $L_B$ from the center line, respectively in the either side. The prescribed distance $L_A$ becomes smaller as shown at an arrow X, as the vehicle speed VS becomes larger. The prescribed distance $L_B$ also becomes smaller as shown at an arrow Y, as the vehicle speed VS becomes larger. Then, the area where the band $W_A$ and the band $W_B$ overlap each other is an allowable actuation range Rp as prescribed by the vehicle speed VS (a prescribed vehicle movement).

In addition, the allowable actuation range Rp corresponds to the reference value of the invention described in claims.

The prescribed distances $L_A$, $L_B$ are set in consideration of the turning mobility of a vehicle and the stability at the turning, considering that each of the left-and-right rear wheel toe angles $\alpha_L$, $\alpha_R$ is physically variable in the range between $-\alpha_0$ and $+\alpha_0$.

In the both-side lines spaced a constant distance $L_A$ in either side from the line A of the band $W_A$, the upper line $A_1$ of the parallel oblique line extending in the left and upper direction corresponds to a value $\beta_0 = \alpha_L - \alpha_R$ and the lower line $A_2$ of the parallel oblique line extending in the right and lower direction corresponds to a value $-\beta_0 = \alpha_L - \alpha_R$. In the both-side lines spaced a constant distance $L_B$ in either side from the line B of the band $W_B$, the upper line $B_1$ of the parallel oblique line extending in the right and upper direction corresponds to a value $\alpha_0 = \alpha_L + \alpha_R$ and the lower line $B_2$ of the parallel oblique line corresponds to a value $-\alpha_0 = \alpha_L + \alpha_R$.

Figure 8C:
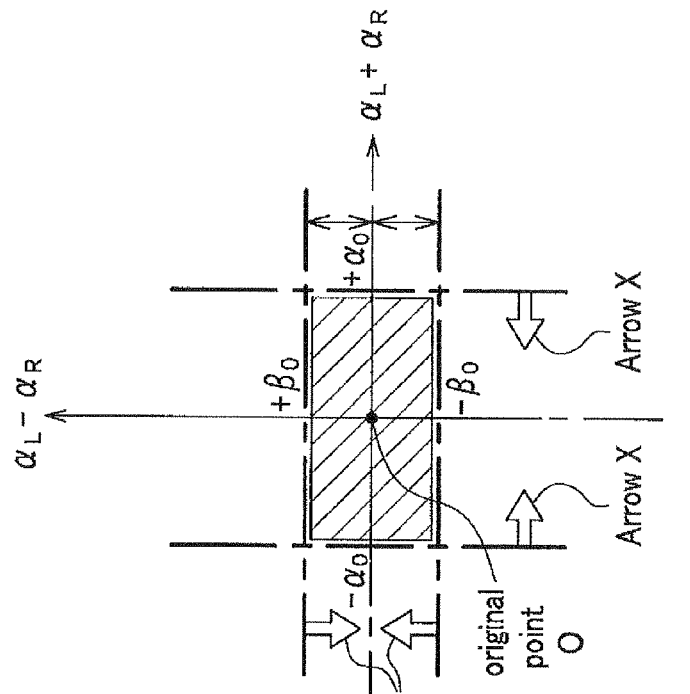

FIG. 8 is an explanation view showing a method of another setting of the allowable actuation range Rp. The explanation will be described later.

At step S14, the actuation judging portion 85 checks whether a combination of the rear wheel toe angles $\alpha_L$, $\alpha_R$ is within the allowable actuation range Rp or not. When the judgment is Yes (the combination is within the allowable actuation range Rp), it proceeds to Step S19. On the other hand, when the judgment is No (the combination is not within the allowable actuation range Rp), it proceeds to step S15.

In the following explanation, it proceeds to step S19, in a case that the combination is within the allowable actuation range Rp.

At step S19, the actuation judging portion 85 checks whether the timer is more than or equal to the prescribed lapse of time $T_0$ or not. In case of Yes (the timer is more than or equal to the prescribed lapse $T_0$), it proceeds to step S20. In case of No, it goes back to step S12 and repeats the above procedures. Herein, as the timer t remains a condition of reset as an initial condition, it goes back to step S12.

At step S14, in case that it proceeds to step S15, that is, the combination is not within the allowable actuation range Rp (No), it checks whether the IFLAG is 1 (IFLAG=1) or not (step S15). In case of Yes (IFLAG=1), it proceeds to step S18. In case of No (IFLAG!=1), it proceeds to step S16. In this case, as IFLAG is zero (IFLAG=0) as an initial condition at step S11, it proceeds to step 516.

At step S16, the actuation judging portion 85 makes the IFLAG to be 1 (IFLAG=1), it proceeds to step S17 to start the timer t and proceeds to step S18. At step S18, the actuation judging portion 85 adds one in the counter n, and proceeds to step S19.

At this step, the timer t has just started at step S18, the timer t is less than the prescribed lapse of time $T_0$ (No), and it goes back to step S12 to repeat the procedures. The procedure goes to step S12 and S13, and then in case that a combination of the rear wheel toe angles $\alpha_L$, $\alpha_R$ is not within the allowable actuation range Rp at step S14, it proceeds to step S15 and S18 to add one in the counter n. Thus, in the procedure of repetition during that the lapse of time to be one (IFLAG=1) becomes more than or equal to the prescribed lapse of time $T_0$ in the timer t (step S12 to S19), the judgment that the combination is not within the allowable actuation range in step S14 is counted in number by the counter n.

In case that the timer t is more than or equal to the prescribed lapse of time $T_0$ at step S19, it proceeds to step S20 and checks whether the counter n is more than or equal to the threshold $N_0$ or not. In case of Yes (the counter n is more than or equal to $N_0$), it proceeds to step S22. In case of No (the counter n is less than the threshold $N_0$), it proceeds to step S21.

At step S21, the actuation judging portion 85 makes IFLAG to be zero (IFLAG=0) and the value of the counter n to be zero (n=0). Then, the actuation judging portion 85 resets the timer (t=0) to go back to step S12 and to repeat the above procedures.

It may be temporarily possible that a combination of the rear wheel toe angle $\alpha_L$, $\alpha_R$ is not within the allowable actuation range Rp caused by the actuation following speed characteristics to the target toe angle $\alpha_{TL}$, $\alpha_{TR}$ of the actuator $30_L$, $30_R$. Then, after the first judgment that a combination of the rear wheel toe angle $\alpha_L$, $\alpha_R$ is not within the allowable actuation range Rp, the judgment that a combination of the rear wheel toe angle $\alpha_L$, $\alpha_R$ caused by the procedure of repetition is not within the allowable actuation range Rp in the prescribed lapse of time $T_0$ is counted by the counter n. In case that the value of the counter n is less than the threshold $N_0$, the counter n resets at step S21 by judging not to be abnormal. Then, it goes back to step S12 to proceed the procedure of repetition.

At step S22, the actuation judging portion 85 outputs an abnormal inspection signal to the target toe angle setting section 73 at the abnormal condition. In this time, the actuation judging portion 85 may input the actual toe angle $\alpha_L$, $\alpha_R$ at the time of judgment to be abnormal in the target toe angle setting section 73 at the abnormal condition. At step S23, the target toe angle setting section 73 at the abnormal condition inputs the calculation stop instruction of the target toe angle and the target toe angle $\alpha_{SL}$, $\alpha_{SR}$ at the abnormal condition in the target toe angle calculation section 71. Then, the target toe angle setting section 73 at the abnormal condition make a reference to the nearest target toe angle $\alpha_{TL}$, $\alpha_{TR}$ outputted by the target toe angle calculation section 71 and the actual toe angle $\alpha_L$, $\alpha_R$ transferred from the actuation judging portion 85. For example, in order to increase the stability, the target toe angle setting section 73 at the abnormal condition inputs in the target toe angle calculation section 71 to become a condition of toe-in slightly such as $\alpha_{SL}$=−0.5 degrees and $\alpha_{SR}$=+0.5 degrees.

Then, at step S24, the target toe angle calculation section 71 outputs the inputted toe angle $\alpha_{SL}$=−0.5 degrees and $\alpha_{SR}$=+0.5 degrees (the prescribed target toe angle at the abnormal condition) into the main calculation section 37a to stop the rear wheel toe angle control. In this time, the system may inform drivers of the abnormal signal of the control of the rear wheel toe angle.

Thus, a series of the above procedures ends up.

As above mentioned, according to this embodiment, a system in the actuation judging portion 85 calculates the allowable actuation range Rp on the basis of vehicle speed VS in the process of repetition. The system checks whether a combination of the rear wheel toe angle $\alpha_L$, $\alpha_R$, as read, is within the allowable actuation range Rp or not. Then, the system stops the toe angle control by judging as the abnormal condition of the actuators 30$_L$, 30$_R$, if the combination is not within the allowable actuation range Rp, when the value of the counter n is more than or equal to the threshold N$_0$ in the prescribed lapse of time.

Even if the combination is not within the allowable actuation range Rp, the system judges the actuators 30$_L$, 30$_R$ not to be abnormal as being a problem of the following speed characteristics in case that the value of the counter n is less than the threshold N$_0$ in the prescribed lapse of time.

In case that a combination of the rear wheel toe angle $\alpha_L$, $\alpha_R$, as read, is not within the allowable actuation range Rp temporarily, a method for avoiding misjudges of the abnormal judgment is not limited to the method showing the above-mentioned flowchart. (1) The system counts the number of times when a combination of the rear wheel toe angle $\alpha_L$, $\alpha_R$, as read, is not within the allowable actuation range Rp at every constant time span (during the prescribed number of repetition). Then, the actuator 30$_L$, 30$_R$ may be judged to be abnormal when the value of the counter n is more than or equal to the threshold N$_0$. (2) The system counts by a timer t the lapse of time during that continues from a time when a combination of the rear wheel, as first read, is not within the allowable actuation range Rp to a time when a combination of the rear wheel becomes within the allowable actuation range Rp. Then, in case that the combination thereof does not come to be within the allowable actuation range Rp in the prescribed lapse of time T$_0$, the actuators 30$_L$, 30$_R$ may be judged to be abnormal.

The system checks on whether a combination of the left-and-right rear wheel is within the normal allowable actuation range Rp at the driving condition of a vehicle. In a method for judging the abnormal condition by individually and respectively watching the toe angle $\alpha_L$, $\alpha_R$ of the left-and-right rear wheel, the system can judge adequately on whether a combination of the left-and-right rear wheel $\alpha_L$, $\alpha_R$ is good for the present driving condition or not, although it could not do that before. As a result, the abnormal condition of a vehicle can be adequately judged. As the above result, the driving condition can be adequately judged on whether it is abnormal or not.

The width designating the allowable actuation range Rp becomes narrower in proportion to the multitude of vehicle speed VS. Then, in case that the actuator 30L, 30R becomes abnormal by accidents or faults at high-speed driving, the actuation judging portion 85 can judge to be abnormal at an earlier stage, compared with the judgment at low-speed driving. Thus, the system can make short the period during that a driver continues to drive without noticing accidents or faults of the actuators 30L, 30R.

In this way, the system does not judge the abnormal condition by individually and respectively watching the toe angle $\alpha_L$, $\alpha_R$ of the left-and-right rear wheel. Then, when one of the actuators 30$_L$, 30$_R$ degrades the adhesion or the following speed characteristics to the target toe angle and the other thereof follows the target toe angle control normally, the adhesion or the degrade of the following speed characteristics will not be judged to be immediately abnormal in the actuation. Therefore, it judged to be abnormal, only in a case where a combination of the left-and-right rear wheel toe angle $\alpha_L$, $\alpha_R$ is not within the allowable actuation range Rp as being variable according to vehicle speed VS.

(Modification)

The present invention is not limited to the above embodiment, for example, the various kinds of variants as mentioned later.

(1) In a judgment to be within the allowable actuation range Rp in the actuation judging portion 85 or not, the system may calculate a value ($\alpha_L + \alpha_L$) and a value ($\alpha_L - \alpha_R$) without use of the actual toe angle $\alpha_L$, $\alpha_R$, as read, and judge whether the value is within the allowable actuation range Rp or not. In this case, left-and-right boundaries of the allowable actuation range Rp in FIG. 8(*c*) will become narrower as shown at an arrow X, as the velocity speed VS becomes larger, in the range of more than or equal to minimal value $-\alpha_0$ and less than or equal to maximal value $+\alpha_0$. As well, upper and lower boundaries will become narrower as shown at an arrow Y, as the vehicle speed VS becomes larger, in the range of more than or equal to minimal value $-\beta_0$ and less than or equal to maximal value $+\beta_0$.

(2) The judgment whether a combination of the toe angle $\alpha_L$, $\alpha_R$ of the left-and-right rear wheel at the actuation judging portion 85 is within the normal range at driving a vehicle or not, does not depend on the allowable actuation range Rp, but may depend on being within either one of the first quadrant to the fourth quadrant of the allowable actuation range Rp according to vehicle speed VS and steering angle $\theta_H$.

In this way, when the system controls independently each toe angle according to vehicle speed VS and steering angle θH, and controls the same phase of the front wheel, the inverse phase of the front wheel, the toe-in state, and the toe-out state in the target toe angle calculation section 71, the system can judge the abnormal condition whether the combination in each of the above conditions is within the allowable actuation range Rp or not.

(3) In stead of the steering angle $\theta_H$ using at the target toe angle calculation section 71 in the embodiment, the front wheel steering angle δ may be used to inspect by the front wheel steering angle inspection sensor SFS as shown by the dotted frame in FIG. 1, and the front wheel steering angle δ may be used to calculate or judge in the target toe angle calculation section 71 and the actuation judging portion 85.

(4) Although the toe angle alteration control ECU 37 is constituted to comprise two CPUs, ROM, RAM, and a microcomputer including peripheral circuits, and motor driving circuits 37$b_L$, 37$b_R$ in the above embodiment, it is not limited thereto. One CPU may have a plurality of cores instead of two CPUs, and each core may constitute the main calculating section 37*a* and the sub calculating section 37*b*.

(5) The electric power steering unit 110 of the present invention comprises a Steer By Wire, in which the steering wheel 3 and the front wheels 1L, 1R are mechanically separated.

(6) The vehicle control system of the present invention is not limited to the steering system 100 of this embodiment. The system may be applied to the distribution control unit for braking power controlling the yaw moment according to steering angle $\theta_H$ and vehicle speed VS by inspecting the steering angle $\theta_H$, vehicle speed VS, and yaw rate of a vehicle. In this case, the system judges by comparing a combination of the value of wheel speed of each wheel with the reference value (an allowable actuation range) fixed by the vehicle speed VS and the steering angle $\theta_H$ by means of the wheel speed sensor provided in each wheel. The abnormal condition of the wheel brake, hydraulic supply to the wheel brake, the abnormal condition of the hydraulic unit can be judged by whether a combination of the value of left-and-right wheel speed at turning is within the range (an allowable actuation range) for the normal cooperative actuation of the wheel brake.

What is claimed is:

1. A vehicle control system having a first actuator and a second actuator controlling the turning of a vehicle comprising:
    a control means of the first and second actuators;
    an inspection means of actuation data of the first and second actuators; and
    a judging means of actuation of the first and second actuators on the basis of the actuation data obtained by the inspection means,
    the judging means having a reference value fixing an actuation range of a combination of the first and second actuators to the prescribed vehicle movement to judge the abnormal condition of actuation of the first and second actuators according to the reference value, wherein the first and second actuators are actuators for respectively and individually changing toe angles of left-and-right rear wheels in a vehicle, the actuation data is actual toe angles of the left-and-right rear wheels, and the reference value is an actuation range of the toe angles of the left-and-right rear wheel fixed according to vehicle speed.

2. The vehicle control system according to claim 1, wherein the judging means judges the abnormal actuation of the first and second actuators in reference to the reference value according to vehicle speed and front wheel steering angle.

3. A vehicle control system having a first actuator and a second actuator controlling the turning of a vehicle comprising:
    a control unit of the first and second actuators; and
    an inspection sensor of actuation data of the first and second actuators,
    the control unit having a judging portion of actuations of the first and second actuators by actuation data inspected by the inspection sensor of the actuations,
    the judging portion having a reference value fixing an actuation range of a combination of the first and second actuators to the prescribed vehicle movement to judge an abnormal actuation of the first and second actuators according to the reference value, wherein the first and second actuators are actuators for respectively and individually changing toe angles of left-and-right rear wheels in a vehicle, the actuation data is actual toe angles of the left-and-right rear wheels, and the reference value is an actuation range of toe angles of the left-and-right rear wheels fixed according to vehicle speed.

4. The vehicle control system according to claim 3, wherein the judging portion judges the abnormal actuation of the first and second actuators in reference to the reference value according to vehicle speed and front wheel steering angle.

5. A method for judging an abnormal actuation in a vehicle control system comprising a first actuator and a second actuator for respectively and individually changing toe angles of left-and-right rear wheels in a vehicle and controlling the turning of a vehicle, a control unit of the first and second actuators, and an inspection sensor for inspecting an actuation data of the first and second actuators, comprising the steps of:
    having a reference value fixing an actuation range of a combination of the first and second actuators to a prescribed vehicle movement in the control unit; and
    judging the abnormal actuation of the first and second actuators in reference to the actuation data obtained by the inspection sensor and the reference value, wherein the actuation data is actual toe angles of left-and-right rear wheels, and the reference value is an actuation range of the toe angle of the left-and-right rear wheels fixed according to vehicle speed.

6. The method for judging an abnormal actuation in a vehicle control system according to claim 5, wherein the method further comprises the step of judging the abnormal actuation of the first and second actuators in reference to the reference value according to vehicle speed and front wheel steering angle.

* * * * *